Figure 1:
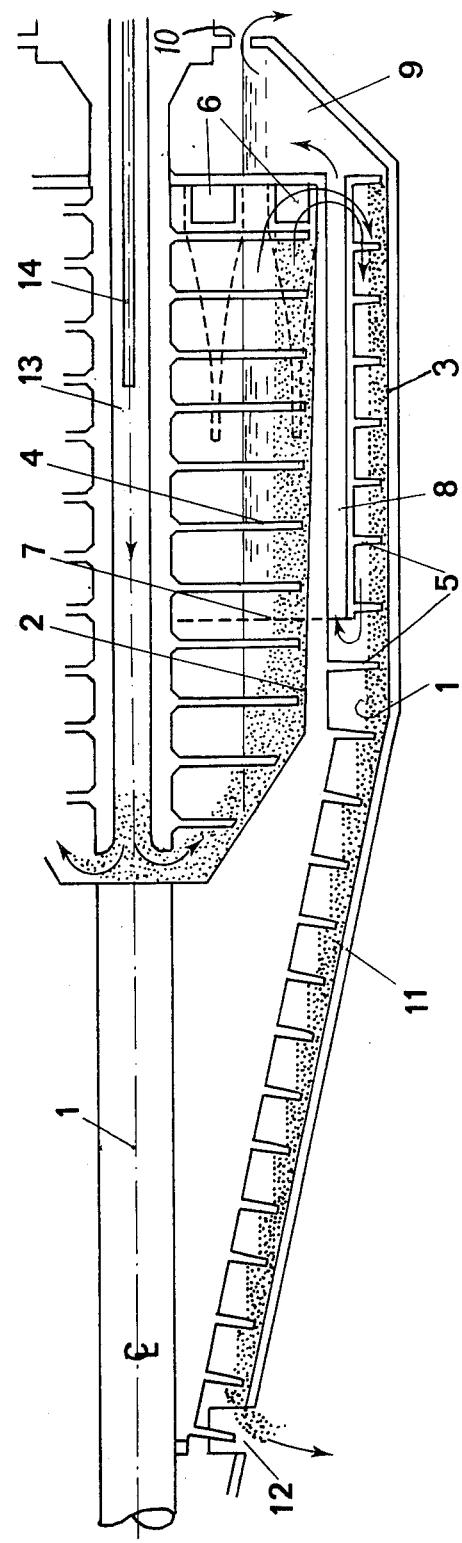

United States Patent [19]
Bye-Jørgensen et al.

[11] 4,085,887
[45] Apr. 25, 1978

[54] CENTRIFUGE FOR DRAINING OFF SEWAGE SLUDGE

[76] Inventors: Jørgen Steen 4, Bye-Jørgensen, Jernbane Alle, 3050 Humlebaek; Gunnar Valdemar Hartvig Larsen, 15, Sofienbergvej, 2960 Rungsted Kyst; Poul Henrik Vermehren, 64, Slotsvej, 2920 Charlottenlund, all of Denmark

[21] Appl. No.: 675,898
[22] Filed: Apr. 12, 1976
[30] Foreign Application Priority Data
Apr. 21, 1975 Denmark .............................. 1702/75
[51] Int. Cl.² .............................................. B04B 1/20
[52] U.S. Cl. ........................................................ 233/7
[58] Field of Search ...................... 233/3, 7, 8, 9, 27, 233/28, 46, 19 R, 19 A

[56] References Cited
U.S. PATENT DOCUMENTS

| 1,064,184 | 6/1913 | Wels | 233/7 |
| 1,806,241 | 5/1931 | Dupuis | 233/7 |
| 2,711,854 | 6/1955 | Kjellgren | 233/7 |
| 2,734,681 | 2/1956 | Schmiedel | 233/7 |
| 3,782,623 | 1/1974 | Jorgensen et al. | 233/7 |

FOREIGN PATENT DOCUMENTS

| 1,082,192 | 5/1960 | Germany | 233/7 |
| 1,027,140 | 3/1958 | Germany | 233/7 |

Primary Examiner—George H. Krizmanich
Attorney, Agent, or Firm—Steinberg & Blake

[57] ABSTRACT

Decanting centrifuge with an inner drum and an outer drum coaxial with the inner drum, each having a helical scraper rotating with a number of revolutions slightly differing from that of the drums, in which sewage sludge to be dewatered is fed to the inner drum and therefrom after initial separation through common passages is transported to the outer drum, in which separated sludge by means of the helical scraper is transported to a discharge at one end and liquid is removed through reject outlets at the other.

8 Claims, 2 Drawing Figures

CENTRIFUGE FOR DRAINING OFF SEWAGE SLUDGE

The present invention relates to a centrifuge for draining off sewage sludge and with two coaxial drums.

It has proved extremely difficult to obtain a satisfactory dewatering of sewage sludge. Therefore, many efforts have been made to improve the design of centrifuges for this purpose. The decanting centrifuges normally used comprise a centrifuge drum, in which a helical scraper rotates with a number of revolutions slightly differing from that of the drum. At one end, the drum has a conus along which the separated sludge is transported to a discharge at the narrow part of the conus. In order to improve separation the efforts have primarily been directed towards avoiding turbulence in the liquid rotating with the centrifuge. Therefore, it has been proposed to provide means for feeding the aqueous sludge into the drum in such a way that sludge, which has once been separated, is not whirled up, or in such a way that flocculated particles are not comminuted and resuspended.

In a known sludge centrifuge the sludge containing liquid is fed into a separation chamber through a feeding screw rotating in a conical chamber, said chamber being coaxial with the centrifuge drum. The separating chamber forms a free volume without protruding parts or other things, which may cause turbulence or disturbance in the liquid flow during the separation. The helical scraper starts from the part of the separation chamber having the largest diameter.

It has also been proposed to combine two or three centrifuges in series in a common rotor in extension of each other in such a way that sludge separated in the first centrifuge is transported to the second centrifuge for further treatment etcetera. This type of centrifuge is very long and expensive in construction, and owing to the long distance between the main bearings it must be designed with the utmost care in order to avoid troubles in operation.

The centrifuge according to the present invention is characterized in that the flow of sludge and liquid is flowing through both drums, and that in both drums a helical scraper is rotating, that the sludge and liquid passing through common passages are transferred into the outer drum, in which the sludge is compressed by a greater g-force and from which the reject is directed to reject outlets and compressed sludge is by means of the helical scraper transported to a sludge discharge.

The centrifuge according to the invention represents a remarkable improvement in the separation and in the capacity per unit of centrifuge volume. Further, it is possible to combine a high degree of separation in a short centrifuge having a relative short distance between the two main bearings.

Figure 2:
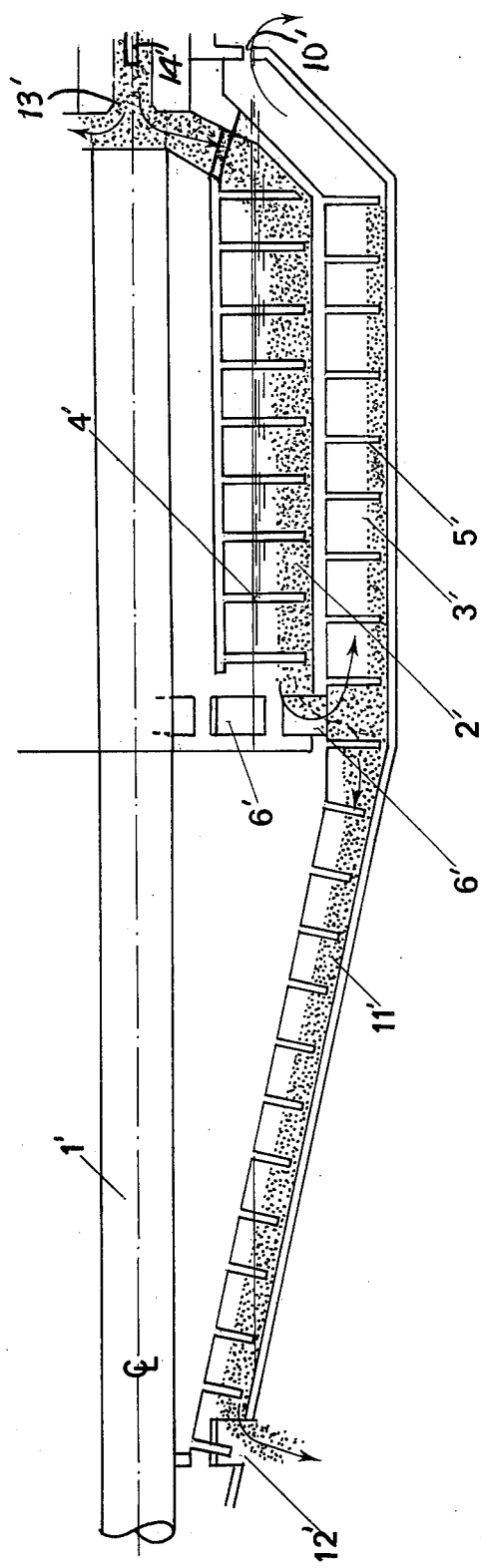

The invention is described in details in the following specification with reference to the drawings, in which:

FIG. 1 shows in axial section an embodiment with an outlet duct for the reject, and FIG. 2 shows in axial section another embodiment with direct outlet of reject.

The decanting centrifuge comprises in FIG. 1 two coaxial drums 2 and 3, each having a helical scraper 4 and 5, respectively. The sludge is fed into the centrifuge through a hollow shaft 13 along the axis of rotation. The scrapers are rotating with a number of revolutions differing by a few revolutions per minute from the number of revolutions of the drums, in such a way that the separated sludge is transported in the direction of the outlet for sludge. It will be noted from FIG. 1 that the scrapers 4 and 5 are oppositely directed in that the scraper 4 feeds the material toward the right in FIG. 1 while the scraper 5 feeds the material toward the left in FIG. 1. Also, FIG. 1 illustrates shafts which drive the drums in given directions of rotation.

The difference $n$ in number of revolutions for the drum 2 and the scraper 4 and $n'$ for the drum 3 and for the scraper 5 is produced by means of a planet — or cyclogear not shown in the drawings. The difference in numbers of revolutions may also be provided by other means, for example by means of belt drives with differently sized pulleys. The difference is normally variable and is normally between 5 to 30 revolutions per minute.

Through a tube 14 chemical compounds to improve separation may be added to the inlet as known per se.

In the drum 2 the sludge containing liquid is exposed to a moderate g-force, which provides less turbulence and presumably a good initial separation. At the right end of the drum 2, as viewed in FIG. 1, where drum 2 has an end wall, both the separated sludge and the liquid flows through passages 6 into the outer drum 3, in which the separated sludge is exposed to further compression at the higher g-force in this area. The liquid, which after the separation is referred to as the reject, leaves the drum passing around an edge 7 into an annular duct 8 to an outlet chamber 9 with outlet or reject ports 10 (FIG. 1) or direct as shown in FIG. 2.

In the embodiment according to FIG. 2, where parts corresponding to those of FIG. 1 are indicated with the same reference characters primed, the liquid with initially separated sludge is transferred to the outer drum 3' approximately at the middle. Most of the sludge is immediately transported by the helical scraper 5' to the discharge 12' for sludge, while the residual contents of finely divided sludge is flowing with the reject in direction of the reject ports 10'. On its way most of the sludge is separated (normally 99%) and is transported to the sludge discharge 12' by the scraper 5'. Thus it will be seen that in both embodiments of the invention the outlets 10, 10' for the liquid communicate primarily only with the outer drum.

In both of the above embodiments of the invention the inner drums 2, 2' and scrapers 4, 4' respectively cooperating therewith form inner rotary inner drum and scraper means for initially receiving the liquid and solids, such as sludge, suspended therein for providing an initial separating stage, while the outer drums 3, 3' and scrapers 5, 5' cooperating therewith, respectively, form for both embodiments an outer rotary drum and scraper means for providing the final stage of separation between the liquid and solids. In both embodiments the passages 6 and 6' form a passage means leading from the inner rotary drum and scraper means to the outer rotary drum and scraper means for directing the liquids and solids separated at the initial stage along a common path to the outer rotary drum and scraper means, so that according to the invention the same passage means is utilized both for the liquid and solids which are separated at the initial stage. In both embodiments the drum of the outer rotary drum and scraper means has at opposite end regions outlets for the liquid and separated solids, respectively. However, in the embodiment of FIG. 1, the inner rotary drum and scraper means feeds the solids and liquids in one direction while the other rotary drum and scraper means feeds the liquids and solids received from the inner rotary drum and scraper means in an opposite direction with the annular duct 8 forming a flow path for the separated liquid for directing the latter from the outer rotary drum and scraper means to the liquid outlet 10. On the other hand, with the embodiment of FIG. 2, the outer rotary drum and scraper means receives the initially separated solids and liquid from the initial stage at an intermediate portion of the outer rotary drum and scraper means and from this intermediate portion feeds solids toward the outlet for the solids while the liquid is free to travel in an opposite direction to the liquid outlet with the scraper of the outer rotary drum and scraper means acting to feed solids from the liquid travelling toward the liquid outlet 10' of FIG. 2 also toward the solids outlet 12'.

The advantage achieved by separating the total amount of sludge and liquid in two steps has proved to be an improved separation and an enlarged capacity per unit of drum volume. Furthermore, it is possible to reduce the length of the centrifuge and the distance between its main bearings, the cost of construction being thereby reduced.

We claim:

1. In a centrifuge for separating solids, such as sewage sludge, from liquid in which the solids are initially suspended, inner rotary drum and scraper means for receiving the liquid with the solids suspended therein and for subjecting them to an initial separating stage, outer rotary drum and scraper means coaxially surrounding said inner rotary drum and scraper means for subjecting the liquids and solids to a final separating stage, said outer rotary drum and scraper means including a drum formed at opposed end regions with outlets for the separated solids and liquid, respectively, and passage means operatively connected with both of said inner and outer rotary drum and scraper means for providing a common path of travel for the liquid and solids flowing from said inner rotary drum and scraper means subsequent to the initial separating stage to said outer rotary drum and scraper means to be subjected to the final separating stage, said inner rotary drum and scraper means initially receiving the liquids and solids suspended therein at one end region of said inner rotary drum and scraper means and feeding the liquids and solids during the initial separating stage toward an opposite end region of said inner rotary drum and scraper means, said passage means communicating with said inner rotary drum and scraper means at said opposite end region thereof, and said liquid outlet of said drum of said outer rotary drum and scraper means communicating primarily only with said outer rotary drum and scraper means for receiving liquid only after the liquid has been subjected to said final separating stage.

2. The combination of claim 1 and wherein said passage means is also situated at an end region of said outer rotary drum and scraper means for delivering the liquid and solids subsequent to the initial separating stage to the latter end region of said outer rotary drum and scraper means, said outer rotary drum and scraper means feeding the solids from said end region thereof toward an opposite end region where said outlet for the solids is situated while the liquid separated at the second stage is free to flow in an opposite direction to the outlet for the liquid.

3. The combination of claim 2 and wherein said inner and outer rotary drum and scraper means respectively feed the solids in opposite directions.

4. The combination of claim 3 and wherein said outer rotary drum and scraper means has in its interior an annular duct for directing the liquid separated at the second stage toward the liquid outlet of said drum of said outer rotary drum and scraper means.

5. In a centrifuge for separating solids, such as sewage sludge, from liquid in which the solids are initially suspended, inner rotary drum and scraper means for receiving the liquid with the solids suspended therein and for subjecting them to an initial separating stage, outer rotary drum and scraper means coaxially surrounding said inner rotary drum and scraper means for subjecting the liquids and solids to a final separating stage, said outer rotary drum and scraper means including a drum formed at opposed end regions with outlets for the separated solids and liquid, respectively, and passage means operatively connected with both of said inner and outer rotary drum and scraper means for providing a common path of travel for the liquid and solids flowing from said inner rotary drum and scraper means subsequent to the initial separating stage to said outer rotary drum and scraper means to be subjected to the final separating stage, said inner rotary drum and scraper means initially receiving the liquids and solids suspended therein at one end region of said inner rotary drum and scraper means and feeding the liquids and solids during the initial separating stage toward an opposite end region of said inner rotary drum and scraper means, said passage means communicating with said inner rotary drum and scraper means at said opposite end region thereof, said passage means being situated at an intermediate region of said outer rotary drum and scraper means while said outer rotary drum and scraper means feeds the solids and liquid during the final separating stage in opposite directions from said intermediate region respectively toward the outlets for the solids and liquid.

6. The combination of claim 5 and wherein said inner and outer rotary drum and scraper means both feed the solids in the same direction.

7. The combination of claim 6 and wherein said inner rotary drum and scraper means receives the liquids and solids to be separated at an end region of said inner rotary drum and scraper means which is adjacent the liquid outlet of said outer rotary drum and scraper means.

8. The combination of claim 7 and wherein said outer rotary drum and scraper means includes a scraper which extends at least through a substantial distance from said intermediate region of said rotary drum and scraper means toward said liquid outlet for separating from the liquid flowing toward the latter outlet solids which are added to the solids travelling from said intermediate region of said outer rotary drum and scraper means to the outlet for the solids.

* * * * *